US012792584B2

(12) United States Patent
Reddy et al.

(10) Patent No.: US 12,792,584 B2
(45) **Date of Patent: *Nov. 10, 2026**

(54) PERFORMING FILE SYSTEM OPERATIONS IN A DISTRIBUTED KEY-VALUE STORE

(71) Applicant: Cohesity, Inc., San Jose, CA (US)

(72) Inventors: Vinay Reddy, San Jose, CA (US); Mohit Aron, Saratoga, CA (US); Vipin Gupta, Cupertino, CA (US); Markose Thomas, San Jose, CA (US)

(73) Assignee: Cohesity, Inc., Santa Clara, CA (US)

( * ) Notice: Subject to any disclaimer, the term of this patent is extended or adjusted under 35 U.S.C. 154(b) by 922 days.

This patent is subject to a terminal disclaimer.

(21) Appl. No.: 17/672,277

(22) Filed: Feb. 15, 2022

(65) Prior Publication Data

US 2022/0261387 A1 Aug. 18, 2022

Related U.S. Application Data

(63) Continuation of application No. 16/256,739, filed on Jan. 24, 2019, now Pat. No. 11,288,248, which is a (Continued)

(51) Int. Cl.
*G06F 16/22* (2019.01)
*G06F 16/17* (2019.01)

(Continued)

(52) U.S. Cl.
CPC ...... *G06F 16/2255* (2019.01); *G06F 16/1774* (2019.01); *G06F 16/2343* (2019.01); *G06F 16/951* (2019.01)

(58) Field of Classification Search
CPC ............. G06F 16/2255; G06F 16/1774; G06F 16/2343; G06F 16/951

(Continued)

(56) References Cited

U.S. PATENT DOCUMENTS 5,826,253 A 10/1998 Bredenberg
5,832,484 A * 11/1998 Sankaran ............ G06F 16/2343 718/107

(Continued)

OTHER PUBLICATIONS

Decandia et al, Dynamo: Amazon's Highly Available Key-value Store, p. 205-218 (Year: 2007).*

(Continued)

*Primary Examiner* — Sherief Badawi
*Assistant Examiner* — Andrew N Ho
(74) *Attorney, Agent, or Firm* — Shumaker & Sieffert, P.A.

(57) ABSTRACT

Techniques are disclosed for managing a high performance, fault-tolerant, strongly consistent, distributed key-value store system. The key-value store may store information, such as metadata for a distributed file system. Fault-tolerance means that the distributed key-value store continues to provide access to values in the key-value store in spite of a certain number of node failures. To provide this capability, the key-value store may store copies of (key, value) pair on N+1 nodes in order to provide fault tolerance for the failure of up to N nodes. In addition, metadata describing which nodes store a given value is stored on 2N+1 nodes and the distributed key-value store is sized such that there are 3N+1 nodes in a cluster. Doing so allows the key, value store to tolerate a failure of N nodes, while still maintaining a consistent and available key-value store.

17 Claims, 12 Drawing Sheets

Related U.S. Application Data continuation of application No. 14/315,128, filed on Jun. 25, 2014, now Pat. No. 10,235,404.

(51) Int. Cl.

| | |
|---|---|
| ***G06F 16/176*** | (2019.01) |
| ***G06F 16/23*** | (2019.01) |
| ***G06F 16/95*** | (2019.01) |
| ***G06F 16/951*** | (2019.01) |

(58) Field of Classification Search

USPC .......................................................... 707/747

See application file for complete search history.

(56) References Cited

U.S. PATENT DOCUMENTS 7,305,421 B2 * 12/2007 Cha ..................... G06F 11/2094
7,536,419 B2 * 5/2009 Liu ......................... G06F 16/27
8,689,043 B1 * 4/2014 Bezbaruah .......... G06F 11/2082 714/4.11
8,719,225 B1 5/2014 Rath
8,874,505 B2 * 10/2014 Lin ..................... G06F 11/3433 707/812
9,329,955 B2 * 5/2016 Bernbo ............... H04L 67/1095
9,479,587 B2 * 10/2016 Bestler ................ H04L 12/1863
9,703,788 B1 7/2017 Bent
9,805,108 B2 * 10/2017 Merriman ............. G06F 16/278
9,817,703 B1 * 11/2017 Ryland ...................... G06F 9/52
10,157,108 B2 * 12/2018 Guerin .................... G06F 17/40
10,235,404 B2 3/2019 Reddy et al.
10,372,685 B2 8/2019 Pradeep
11,288,248 B2 3/2022 Reddy et al.
2003/0051109 A1 * 3/2003 Cochran ................. G06F 3/065 711/162
2003/0079100 A1 4/2003 Williams
2006/0101081 A1 5/2006 Lin et al.
2007/0203910 A1 * 8/2007 Ferguson ............ G06F 16/2452
2010/0094937 A1 4/2010 Chalouhi
2010/0306222 A1 12/2010 Freedman
2010/0332463 A1 12/2010 Farmer
2010/0332471 A1 12/2010 Cypher
2011/0016090 A1 1/2011 Krishnaprasad
2011/0191389 A1 8/2011 Okamoto
2012/0011398 A1 * 1/2012 Eckhardt ............. G06F 11/2097 714/15
2012/0110055 A1 5/2012 Van Biljon
2012/0303576 A1 * 11/2012 Calder ................ G06F 16/2379 707/611
2012/0323851 A1 12/2012 Basescu
2013/0031229 A1 1/2013 Shiga
2013/0103729 A1 * 4/2013 Cooney ................. G06F 16/252 707/831
2013/0218840 A1 * 8/2013 Smith ................. G06F 16/2474 707/639
2013/0226890 A1 8/2013 Markus
2013/0238556 A1 9/2013 Mielenhausen
2013/0297580 A1 11/2013 Markus
2013/0318314 A1 11/2013 Markus
2013/0346444 A1 12/2013 Makkar
2014/0156618 A1 * 6/2014 Castellano .............. G06F 16/13 707/703
2015/0127625 A1 * 5/2015 Bulkowski ............. G06F 16/27 707/703
2015/0193264 A1 * 7/2015 Hutton .................... G06F 9/466 719/328

OTHER PUBLICATIONS

Mike Burrows, The Chubby lock service for loosely-coupled distributed systems, 7th Edition, p. 335-350 (Year: 2006).*
Dan Ports, "Application-Level Caching with Transactional Consistency", p. 46-69 (Year: 2012).*
Basescu et al., "Robust Data Sharing with Key-Value Stores", Proceedings of the 30th annual ACM SIGACT-SIGOPS symposium on Principles of distributed computing, IEEE, Jun. 6, 2011, 23 pp.
International Preliminary Report on Patentability from International Application No. PCT/US2015/037460 dated Dec. 27, 2016, 8 pp.
Prosecution History from U.S. Appl. No. 14/315,128, now issued U.S. Pat. No. 10,235,404, dated Aug. 22, 2016 through Nov. 7, 2018, 260 pp.
Prosecution History from U.S. Appl. No. 16/256,739, now issued U.S. Pat. No. 11,288,248, dated Apr. 23, 2019 through Feb. 24, 2022, 267 pp.
International Search Report and Written Opinion dated Sep. 14, 2015 for Application No. PCT/US2015/037460.

* cited by examiner

Read After Write (RAW)

PERFORMING FILE SYSTEM OPERATIONS IN A DISTRIBUTED KEY-VALUE STORE

CROSS REFERENCE TO OTHER APPLICATIONS

This application is a continuation of U.S. patent application Ser. No. 16/256,739, entitled PERFORMING FILE SYSTEM OPERATIONS IN A DISTRIBUTED KEY-VALUE STORE filed Jan. 24, 2019, which is a continuation of U.S. patent application Ser. No. 14/315,128, now U.S. Pat. No. 10,235,404, entitled DISTRIBUTED KEY-VALUE STORE filed Jun. 25, 2014, each of which is incorporated herein by reference for all purposes.

BACKGROUND

Field

Embodiments presented herein generally relate to distributed computing. More specifically, embodiments presented herein provide techniques for allocating shared resources to a distributed key-value store.

Description of the Related Art

A distributed computer system includes software components located on multiple computers coupled to a network and which communicate and coordinate actions by passing messages to each other over the network. Each networked computer or node generally has its own memory and local data store.

Key-value stores are an effective way to manage data, as they are not based on relational tables and structured query languages. Essentially, a key-value store is a large dictionary. Providing the key-value store with a key allows the update or return of a value, where the value can be data of almost any type, thus making the key-value store adaptable to a variety of applications.

A distributed computer system often includes a file system, such as POSIX-compliant file system, for managing the data files accessible by the multiple computers or nodes in the distributed system. File systems, such as POSIX-compliant file systems, rely on metadata (information about the data in the file system) to find and modify data in the file system. The manner in which the distributed system manages the metadata determines the characteristics of the file system. Specifically, if it is desired that the file system have high availability, good scalability, and high performance, then the metadata subsystem for the file system should also have these same characteristics.

Thus, to have high availability, the metadata subsystem in the distributed computer system should be able to tolerate failure of a certain number of computers in the distributed system. To have good scalability, the metadata subsystem needs to adapt to handling a greater number of files and computer systems. To have good performance, operations on the metadata system needs to occur quickly, as the speed with which the metadata subsystem can be accessed determines in the large part the speed with which the data files can be accessed.

SUMMARY

One embodiment of the invention includes a method for accessing metadata in a distributed key-value store stored on a plurality of computing nodes. This method may generally include receiving, by a first one of the nodes, a message from a requesting client to perform a read operation to read a value stored in the key-value store for the first key. The message itself includes the first key and a lock sequence number and wherein the requesting client holds a lock for at least the first key. Upon determining the lock sequence number is equal to or greater than a stored sequence number stored with the first key in the key value store, the value of the first key is read from the key-value store. The key value is then returned to the requesting client.

In a particular embodiment, reading the value of the first key itself includes reaching consensus between at least two of the plurality of nodes regarding the value of the first key. For example, the nodes may use the Paxos algorithm to reach consensus on the correct value associated with the first key, as stored by the distributed key value store. This method may still further include, upon determining the lock sequence number is greater than the stored sequence number, converting the read operation to a write operation and setting the stored sequence number to equal the lock sequence number.

In still another embodiment, the method may further include receiving, by a second one of the nodes, a message from the requesting client to perform a write operation to write a new value in the key-value store for the second key. The message includes the second key, the new value, a lock sequence number, and a version number. Further, the requesting client holds a lock for at least the second key. Upon determining (i) the lock sequence number is equal to or greater than a stored sequence number stored with the second key in the key value store and (ii) the version number in the request matches a stored version number stored with the second key in the key value store, the new value is written in the distributed key value store for the second key and the stored version number is incremented.

In a particular embodiment, the metadata stores file system metadata for a distributed file system, and wherein the value provides either a location of a file system object corresponding to the key or a file system object.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
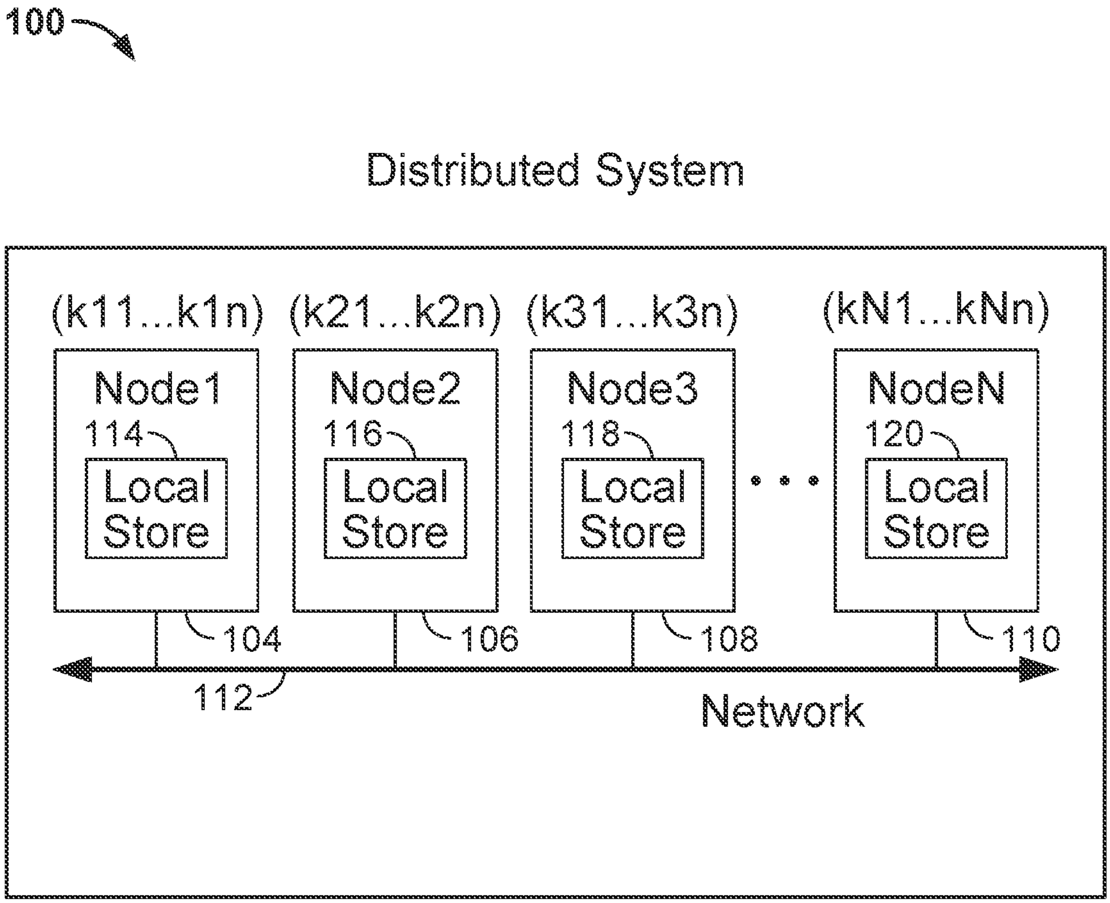
FIGS. 1A-1B depict an example of a distributed system, according to an embodiment of the invention.

Embodiments presented herein provide a high performance, fault-tolerant, strongly consistent, distributed key-value store system for storing information, such as metadata for a distributed file system. Fault-tolerance means that the distributed key-value store continues to provide access to values in the key-value store in spite of a certain number of node failures. To provide this capability, in one embodiment, the key-value store replicates each (key, value) pair to N+1 nodes in order to provide fault tolerance for the failure of N nodes. In addition, metadata describing which nodes store a given value is stored on 2N+1 nodes and the distributed key-value store is sized such that there are 3N+1 nodes in a cluster. Doing so allows the key, value store to tolerate a failure of N nodes, while still maintaining a consistent and available key-value store. For example, for N=1, two nodes of the cluster store a given value, three nodes store metadata indicting which nodes store that value, and do so in a cluster of four nodes. Of course, a cluster may be expanded to include many more than four nodes, and it is not uncommon for a cluster to include hundreds of nodes.

Advantageously, this arrangement allows the distributed key-value store to survive a failure of one node without any loss of data. In the event a primary node associated with a given key value fails, a secondary node can read and write to that that value in the distributed key-value store. Further, following the failure of one node, the system can make progress towards a state where the system again has two copies of data values and metadata that were stored on the failed node. For example, the secondary node (effectively replacing the primary node) can replicate key values to another node (resulting in the system again having N+1 copies of a given key value). Similarly, the metadata associated with a given key value may be replicated to other nodes (resulting in the cluster again having 2N+1 copies of key-value metadata).

Consistency means that the replicated key values of the key-value store on the other nodes are the same when read from the store. Note, the values on each node are not always be the same at the same time (e.g., when a write is made to a key-value on a primary node, the secondary node stores a previous value, until being updated as part of the write operation. Should the primary node fail before the secondary node is updated, the write operation fails. More specifically, consistency means that any two successive reads will return the same value, unless, and only unless, a write operation occurred between the two reads. This property is referred to read-after-read (RAR) consistency. The process for read-after read consistency is used to reject stale writes from older clients. For example, if a client C1 issues a write and fails, and a client C2 now issues a read to the same key, then the next read from C2 is guaranteed to return the same value, even if the write from C1 were to get to the Scribe server, it would reject the write.

Similarly, any read after a successful write operation will return the value written by the write operation. This property is referred to read-after-write (RAW) consistency. As described below, the key value store provides both RAR consistency and RAW consistency, even when a write operation is interrupted by a node failure before being successfully completed. High-performance means that steps are taken to reduce the amount of network traffic needed to support both fault-tolerance and consistency.

As described, embodiments provide a key value store that includes a plurality of nodes connected to a network. Data is written to and read from the key-value store using a key value (k). That is, each data value (v) is associated with a distinct key value (k) creating key value information (k,v). Data is read and written to/from the key value store using the (k,v) information.

In one embodiment, each node includes a distributed lock service and a scribe process. The scribe process performs read and write operations to the key-value store on behalf of clients. The primary (k,v)-store on a given node acts as the primary for some portion of key values (k), as determined using a consistent hashing algorithm. The node may also store a secondary (or tertiary, etc.) copy of some key values in order to maintain N+1 copies of each key value on nodes within the cluster. The scribe process on each node performs read and write operations against the (k,v)-store on that node. To do so, a scribe client obtains locks and sequence numbers from the distributed lock service and sends messages to a scribe process on the primary node associated with a (k,v) value requesting read/write operations. The replication process replicates values written to the (k,v) store across nodes in a consistent manner. In one embodiment, the replication process may use a consensus protocol (such as the Paxos algorithm) to replicate a value written on one node to at least N+1 nodes (at which point a write operation may be reported to a client as successful). In operation, updates to the key-value store use the consensus protocol (again, such as Paxos) to maintain fault-tolerance and a consistency protocol to maintain consistency. The consensus protocol ensures that an update to the key-value store is replicated to N+1 nodes in the distributed system. Summarily, the Scribe process uses the consensus protocol to reach consensus regarding 2N+1 copies of location metadata. The consistency protocol ensures that an update is a consistent one, which means that a read occurring after a write to the key-value store returns the latest value, and that a read following a read with no intervening write return the same value.

The fault-tolerant, consistent, and high-performance key-value store is particularly suited to store metadata values for file system objects in a file system, such as inodes. In such embodiments, the scribe process may provide a metadata store for data backed-up by the nodes of the cluster. Each node in the cluster may itself be part of a distributed secondary storage backup appliance, providing backups to a primary storage system. For example, if used to backup a primary cluster hosting virtual machine instances, the secondary storage system could store VMDK files (virtual hard disk drives used by Virtual machines spawned on the primary cluster). Further, in such embodiments, the (k,v) key value managed by the scribe process indicates where a file system object or an element of backup data (e.g., a file or portion of the VMDK file) is located on a physical disks drive of one of the nodes. In addition, for inodes related to relatively small files (e.g., files up to 256K bytes), the key-value store can also store the file associated with file system metadata directly.

FIG. 1A depicts an example of a distributed system, according to an embodiment of the invention. The distributed system includes a cluster of computing nodes 104, 106, 108, 110, each of which has its own local store 114, 116, 118, 120. Each node may be a computer system with a processor, a memory and storage devices. The key value store may be implemented using any combination of magnetic disk and solid-state drive memory (SSD). Network 112 connects nodes of the cluster to one another. The nodes 104, 106, 108, 110 cooperate with each other by passing messages on the network 112. It is assumed that messages on the network from the same source are delivered in the order sent and that messages sent between healthy nodes are eventually delivered. Note, a node that fails to communicate with peer nodes for a certain amount of time is deemed "dead."

As shown, a key-value store is distributed over the nodes. Each node 104, 106, 108, 110 in the system 100 maintains a portion of the key-value store. For example, node 1 is assigned responsibility for maintaining keys k11 . . . k1n; node 2 is assigned responsibility for maintaining keys k21 . . . k2n; node 3 is assigned responsibility for maintaining k31 . . . k3n; and node N is assigned responsibility for keys kN1 . . . kNn. Distribution of the keys over the nodes can occur at initialization time or a time at which the nodes are reconfigured, if there is a node failure. As described in greater detail below, keys may be assigned to a node using a consistent hashing function which generally distributes keys equally across the nodes.

Additionally, in one embodiment, at least one node in the system is designated as a backup node for the portion of the (k,v)-store on another node in the system. In that role, the backup node maintains a copy of the portion of the (k,v)-store of the other node. If a primary node fails, the backup node for the failed node's (k,v)-store handles the failed node's (k,v)-store by making available its copy of the failed node's (k,v)-store. This implies that there are at least two copies of each key and value in the (k,v)-store and that these two copies store the same (k,v) key values (to tolerate N=1 failures). If an update is in progress, different nodes may have a different value, until the update process is complete or one node may have a "stale" value when certain node failures occur. However, as described below, a read operation will resolve any inconsistencies between nodes by returning a value written by the most recent completed write, even where a node failure has occurred.

Distributing keys over the nodes may use a consistent system for mapping portions of the (k,v)-store to each node. In one embodiment, a hashing mechanism is used to determine which node a given key value should be written to. Each key is consistently hashed to a given hash bucket, where a bucket typically corresponds to a node in the system. Thus, a particular node is the primary node for one of the buckets and a secondary or backup node for some number of other buckets, depending on the number of duplications needed to handle N node failures. If a node is added to a system with N nodes, the keys in each of the buckets are redistributed among the nodes so that each node has 1/(N+1) of the total keys. This entails moving 1/(N+1) of the keys from the existing nodes to the new node.

The consistent hashing function assures a stable mapping of a key to a hash bucket, regardless of which nodes stores (k,v) key values for that bucket. For example, assume the cluster of four nodes 104, 106, 108, 110 are configured to tolerate a failure of any one node (i.e., N=1). In such a case, the consistent hashing function may hash a given key (k) to one of four buckets (B) 1, 2, 3, or 4. Each node obtains a lock indicating which bucket that node is responsible for maintaining. For example, node 104 may be the preferred primary node for bucket B=1 and node 104 obtains a lock for this bucket from the distributed lock service. Similarly, nodes 106, 108, and 110 can obtain a lock for buckets 2, 3, and 4 respectively. Further, if the primary node for a given bucket is (B), the next node to the right (B+1) can take over as a preferred node for the that bucket and the next two nodes (B+1 and B+2) can take over as the preferred nodes for replicating location metadata indicating which nodes store a given (k,v) key-value. Note, node 110 wraps around to node 104 in this example when finding a "next" node.

In one embodiment, a node "liveness" service, along with locks from the distributed locking service, assist in reconfiguring the system. When a node fails, the failed node's portion of the key-value store is maintained by the secondary node until the failed node can be restored. For example, node 106 may hold a lock from the distributed lock service indicting that node 2 is the primary node for (k,v) keys that hash to the bucket B=2. That is, for keys that hash to the value B=2, node 106 is the primary node. Should node 106 fail, then a secondary node (node 108 in this example) is the backup node. After the failure of node 106 is identified, node 108 obtains a lock from the distributed lock service for the bucket B=2 and performs operations on keys that hash to this bucket. For example, in addition to writing a (k,v) key value on node 108 (again, which hashes to bucket B=2), node 108 can replicate copies of a given (k,v) key-value to node 110 (to maintain N+1 copies of a (k,v) key-value) and replicate metadata on node 108 indicating which nodes store a given (k,v) key-value to node 110 and node 104 (to maintain 2N+1 copies of location metadata). For example, a background scan periodically determines if any of the keys need to be moved (or if the replication factor has to be upped based on current "liveness" information).

Similarly, each node may run background processes that periodically scan for node "liveness" information to determine whether a given node (or process on a given node) has failed. For example, should node 108 fail, any (k,v) key-values stored as secondary copies on node 108 (e.g., (k,v)-values for which node 106 is the primary node) need to be replicated elsewhere. In such a case, a process on node 106 may determine that the distributed system 100 has reached consensus that node 108 has failed. In response, the background process on node 106 can use the location metadata to identify (k,v) key-values which are stored on node 106 as a primary location and node 108 as a secondary location. Any such values are then replicated to node 110 (and location metadata is updated on nodes 110 and 104).

The background process on a node periodically goes over all the data to determine if any of the keys need to be moved (or if the replication factor has to be upped based on current liveness information). For example, if key-value data is stored on two nodes say node A and node B, and if node B failed, the background scan would observe that only 1 copy of the data was available. The background process would increase the replication factor of the data so there were 2 copies of the data available (by maybe copying the data to node C). Nodes 104 and 110 perform a similar process to ensure that the cluster has N+1 copies of key, value data and 2N+1 copies of location metadata following a failure of node 108, for a cluster configured to tolerate N=1 failures For a cluster where N is greater than 1, the number of copies of data and copies of location metadata is scaled accordingly.

Once the preferred primary is restored (node 106 in this example), node 108 can release the lock on bucket B=2 and node 106 can again begin processing read and write operations for (k,v) keys which hash to the bucket B=2. In such a case, node 106 may have "stale" values for any (k,v) key-values which hash to the bucket B=2 that were written to node 108 while node 106 was unavailable. However, when processing any reads to (k,v) store keys which hash to the bucket B=2, node 106 can resolve this inconsistency by updating (k,v) key values when performing a read operation. In case of a write operation performed after node 106 is restored, node 106 writes a new value to the (k,v) key value store on node 106 and replicates the write to the next available node (node 108 in this example, unless node 108 has itself subsequently failed, in which case, a write made to a (k,v) key value on node 106 is replicated to node 110).

Figure 1B:
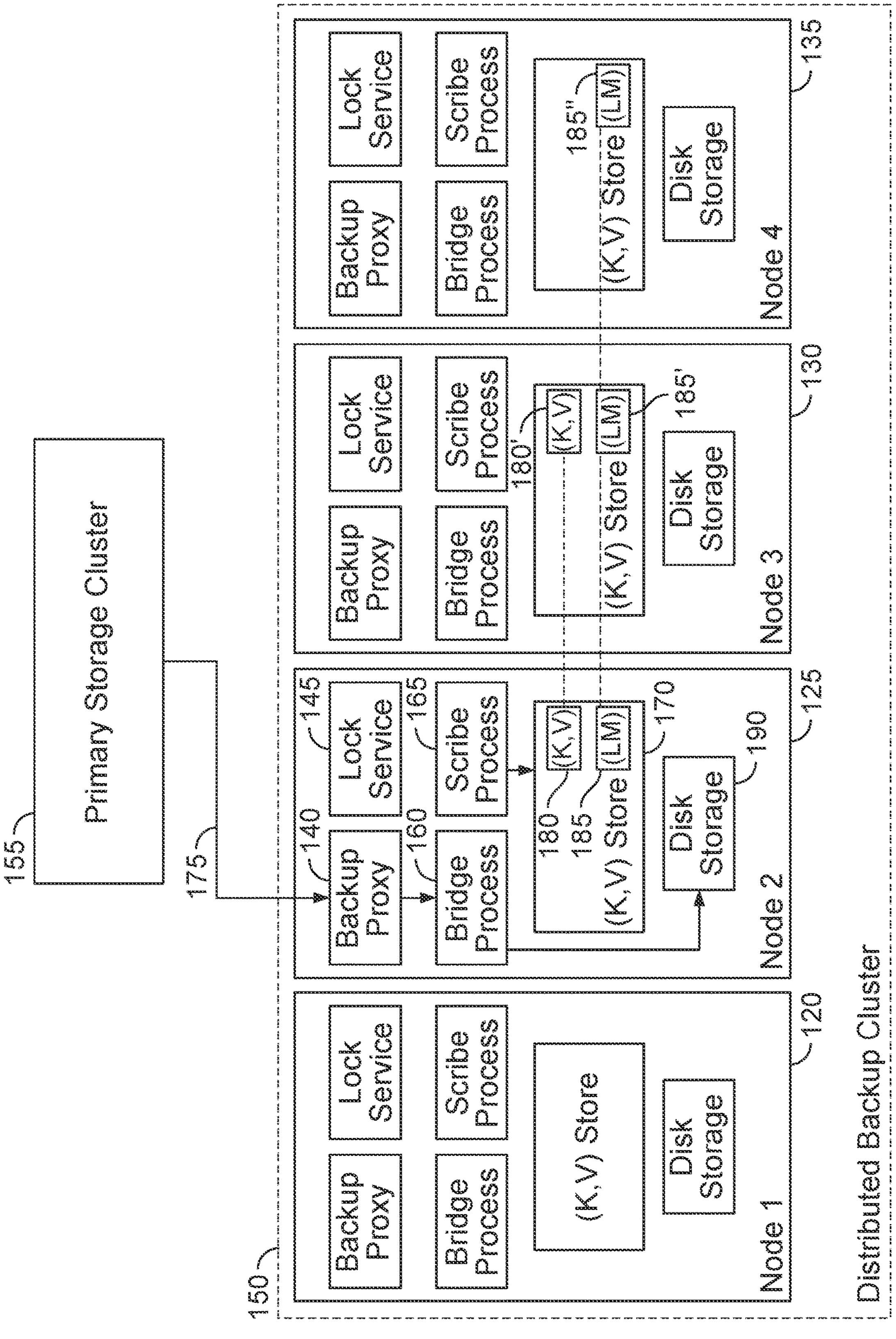

FIG. 1B illustrates an example of a distributed backup cluster 150 providing backup services to a primary storage cluster 155, according to one embodiment. As shown, the distributed backup cluster 150 includes a node 1 (120), node 2 (125), node 3 (130), and node 4 (135). Nodes 120, 125, 130, and 135 each include a set of software applications, e.g., an instance of a backup proxy 140 used to capture backup files and file system metadata from primary storage cluster 155, a lock service 145, a bridge process 160 scribe process 165, a (k,v)-store 170 (e.g., stored on a solid-state storage device (SSD)), and disk storage 190 (e.g., a magnetic disk drive or RAID array of such drives). For convenience, operations of these processes on nodes 120, 125, 130 and 135 are described relative to node 2 (125).

In one embodiment, the backup proxy 160 provides a software component used to access data from primary storage cluster 155. For example, the backup proxy 160 could be configured to provide a backup of a primary storage cluster 155 for a VMware cluster. In such a case, the backup proxy 140 could communicate with the primary storage cluster 155 using the vStorage APIs for Data Protection VADP APIs available from VMware, Inc. Of course, depending on the primary system being backed up by the distributed backup cluster 150, other protocols for backing up data may be used.

The backup proxy 140 on node 2 (125) obtains backup data (e.g., files) from the primary storage cluster 155, represented as an arrow 175. In one embodiment, backup data obtained by the backup proxy 140 is given to bridge process 160, which in turn stores the backup data in the disk storage 190 (or in some cases, in the (k,v)-store 170). The bridge process 160 also sends messages to the scribe process 165 requesting the scribe process 165 perform read and write operations on file system metadata (e.g., inode data) regarding how and where the backup data is stored in the disk storage 190 (or in some cases, in the (k,v)-store 170 directly). For example, assume the bridge process 160 receives a virtual machine disk (VMDK) file from the backup proxy 140. In such a case, the bridge process writes the VMDK file to disk storage 190. The number of copies of actual data files that bridge 160 stores on hard disks can vary. That is, the cluster 100 may be configured to store more than N+1 copies in disk storage. Similarly, the disks themselves may be arranged to independently tolerate disk failures (e.g., as a RAID array). However as a VMDK file can be quite large (e.g., terabytes), bridge process 160 may store the VMDK file as set of smaller blob (binary large object) files, each having a set of chunks (e.g., 1 Mb each). Backup data below a given size threshold (e.g., files less than 256K bytes) could be stored in the (k,v) store directly.

In addition, the bridge process 160 may send requests to the scribe process 165 to write metadata to the (k,v)-store 170 indicating how and where the VMDK file is written to the disk storage 190. That is, the metadata can indicate which of N+1 nodes store a copy of a file (or data). Note, some of the (k,v) values written by the bridge process 160 may hash to bucket on one of the other nodes (e.g., node 120, 130, or 135), if such cases bridge process 160 on node 125 sends requests to the scribe process 165 on the appropriate node.

As described below, to perform an operation on file system metadata (i.e., on the (k,v) key values in the (k,v)-store 170), the bridge process 160 obtains read/write locks and sequence values from lock service 145. In addition to issuing lock primitives, the lock service 145 may also monitor a state of the constituent nodes and processes in the distributed backup cluster 150 regarding a "liveness" or health of the bridge process 160, the scribe process 165 on node 2 (125), as well as on the health of corresponding processes on node 1 (125), node 3 (130), and node 4 (135). As described below, when a node or process becomes unavailable, and when the lock service 145 across multiple nodes reaches consensus that a given node or process has failed or become unavailable, the lock service 145 marks that node or process as being unavailable. Further, processes on the nodes of cluster 150 may register to be notified of health status changes to other processes in the cluster 150.

The lock service 145 may also include an API that allows the backup proxy 140, bridge process 160, and scribe process 165 to obtain locks (e.g., read locks and write locks) for keys stored in the (k,v) store 170. The lock service 145 may also include an API used to generate monotonically increasing numbers, referred to as sequence numbers or "sequencers," issued with a lock.

To perform read/write operation on a given (k,v) key value in (k,v)-store 170, the bridge process 160 obtains an appropriate read/write lock from the lock service 145. In one embodiment, locks obtained from the lock service 145 include a monotonically increasing number used as the "sequencer" for read/write operations on the keys associated with a given lock. That is, each new lock issued on a given key has a greater sequencer value than any previous lock on that same key. As described below, (k,v) key values in the (k,v)-store 170 includes the value of the sequencer last used to read or write to a given (k,v) key value, and the scribe process 165 will reject any operation on a (k,v) key value that supplies a sequencer lower than the sequencer stored in the (k,v) store 170 for that (k,v) key value. For performance reasons, the bridge process 160 (or other scribe client) typically receives a sequencer for given lock only once, and this sequencer can be used with any key associated with that lock to perform multiple read/write operations, so long as the bridge process 160 retains that lock.

If the bridge process 160 fails, or decides to release a lock on a set of keys, any subsequent lock on any of the same keys is issued with a greater sequence number. Should the bridge process 160 go down, an incomplete operation may be restarted either by a subsequent instance of the bridge process 160, or should node 2 (125) itself fail, an incomplete operation may be restarted on another one of the nodes in cluster 150. However, any scribe client (e.g., any bridge process 160 in the cluster 150) requesting a lock on a key previously locked by the failed process obtains a lock with a greater sequencer number than the one associated with the previous lock. The reinstated process can then re-issue the failed read/write operation with this higher number set as the sequencer. As a result, operations initiated by the failed process (or node) can no longer modify the (k,v) values in the (k,v)-store 170, because any such operations will be associated with a lower sequencer value, once any read (or write) to the relevant (k,v) key value occurs. Doing so prevents any "in-flight" writes from modifying data stored in the (k,v)-store 170 after (i) the process which initiated a write has failed and (ii) a new lock on that key value is issued to another scribe client and used to perform a read or write operation. That is, the monotonically increasing sequencer for each key (k) ensures that the file system metadata stored in the (k,v)-store 170 exhibits read-after-read and consistency, as a successful read operation performed after a failed write operation is guaranteed to have a greater sequencer number than one associated with the failed write. After performing a current read operation, the scribe process 165 rejects any write operations with a sequencer number that is less than the current read operation.

As noted, the scribe process 165 performs read and write operations on the file system metadata stored in the (k,v)-store 170. For example, the bridge process 160 may send read and write operations to the scribe process 165 to update the file system metadata for files stored in disk storage 190. The scribe process 160 may be responsible for creating N+1 copies of a (k,v)-key value after as part of a successful write operation. Doing so allows the distributed key-value store on cluster 150 to tolerate N node failures. For example, after writing a key value KV 185 on node 2, scribe process 165 replicates this value in the (k,v) store on node 3 (130), shown as KV 180'. The scribe process 165 also writes location metadata LM 185 to 2N+1 nodes of the cluster 150, in order to tolerate N node failures. The location metadata LM 185 indicates which nodes store a given (k,v) value. For example, as shown, metadata LM 185 is stored on node 2 (125) as a primary node and on node 3 (130) and node 4 (135) as backup copies of LM 185' and LM 185''. Writing 2n+1 copes of location metadata allows the (k,v) store to reach consensus regarding which nodes have the correct location metadata for a given (k,v) key value, regardless of any single node or process failures that may occur.

As noted, in one embodiment, each (k,v) key values in (k,v)-store 170 also stores a sequencer and a version number. The stored sequencer number is associated with the last complete read or write performed by the scribe process 165 on a given key (k,v) value. When read or write operations issued by scribe clients also supply a sequencer number, the scribe process 165 performs a requested read or write only if the supplied sequencer is greater than or equal to what is stored with the key value being read or written. If the supplied sequencer is larger, the scribe process updates metadata associated with a key being read (or written) to store this larger sequencer. Accordingly, a read operation may be converted into a write operation. This occurs when a read operation supplies a larger sequencer than what is stored in the (k,v) store 170 for a given key. In such cases, the higher sequence number submitted with the operation is written to the key. As noted, operations submitted by a scribe client with a lower sequence number than what is stored with a given key value are rejected.

As a result, if a new client has read from or written to a (k,v) record, stale writes issued from an older client (that have a smaller sequencer) are rejected by the scribe process 165. Doing so ensures that any two back-to-back reads by requested by a scribe client return the exact same value. In addition, the scribe process 165 on node 2 (125) replicates each (k,v) key value stored on node 2 (125) to other nodes in the cluster 155 as part of a successful write operation.

Figure 2:
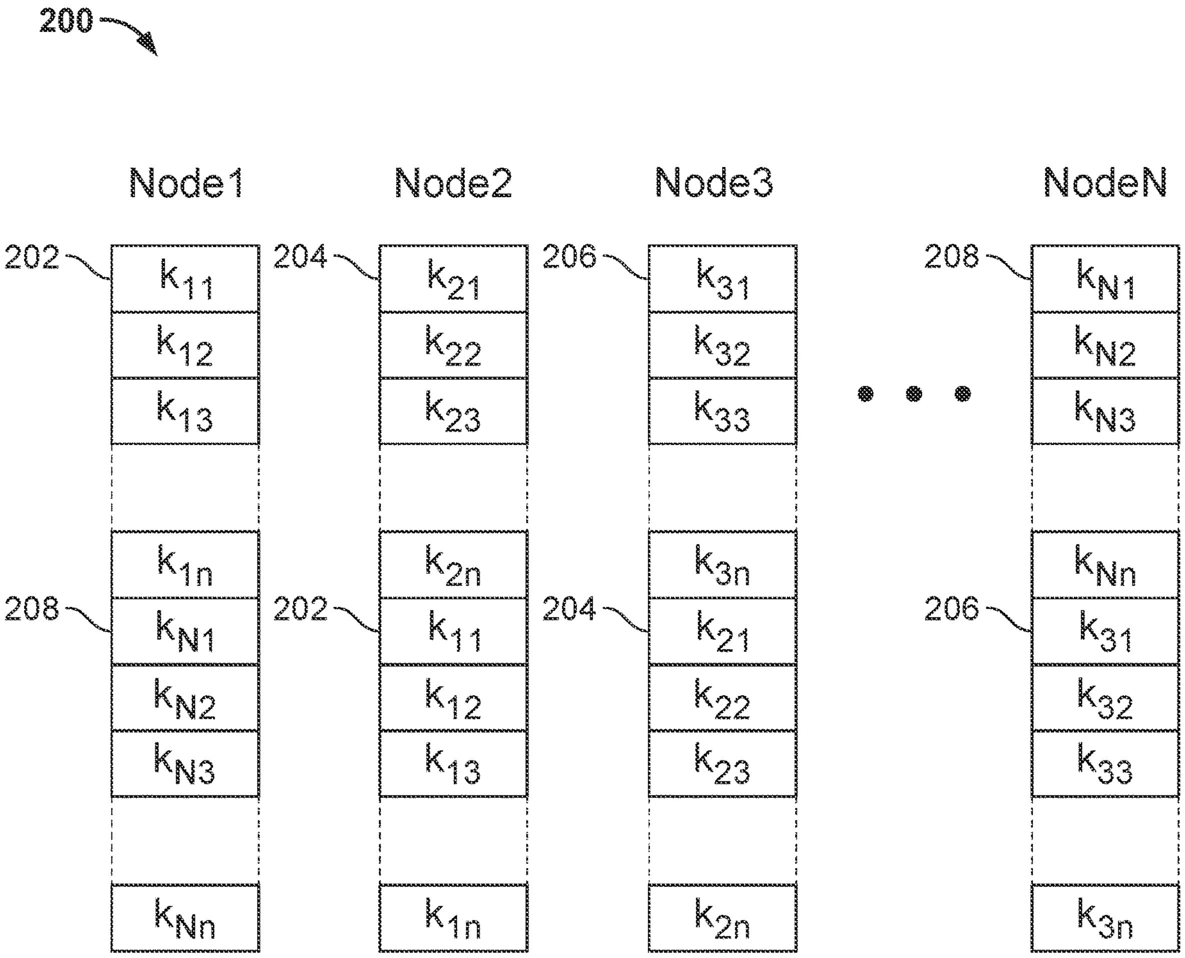
FIG. 2 depicts an example of a distributed key-value store, according to an embodiment.

FIG. 2 depicts an example of a distributed key-value store 200, according to an embodiment of the invention. As shown, each node in FIG. 2 corresponds to one of the nodes in FIG. 1. Additionally, each node is assigned to be primary node for one key set and a backup node for another key set if the primary node for the other key set fails. Node failure generally includes any event that makes the node untrusted, such as the failure of a process, a hardware failure, or loss of network connectivity. In one embodiment, active nodes may determine that a given node has failed when the failed node stops responding to messages sent over the network within a certain amount of time. For example, the distributed lock service on nodes 1, 3, and N, may use a consensus protocol (such as the Paxos algorithm) to reach a consensus that node 2 is not "alive," should node 2 stops responding to messages. Once such consensus reached, the distributed lock service may release any locks held by node 2, allowing node 3 (if "alive") to obtain a lock for the bucket B=2.

As shown, node 1 contains key sets 202 and 208, where node 1 is the primary node for set 202 and node N is primary for set 208. Node 2 contains key sets 204 and 202, where node 2 is the primary node for key set 204 and node 1 is the primary node for key set 202. Node 3 contains key set 206 and 204, where node 3 is the primary node for key set 206 and node 2 is the primary node for key set 204. Node N contains key sets 208 and 206, where node N is the primary node for set 208 and node 3 is the primary node for set 206. This simple assignment scheme is based on using the hashing function to identify a primary node (or bucket) for a given key, and from the identified the primary node, the preferred backup node. Of course, the hashing mechanism is only one way to assign management responsibility of backup sets to nodes. Of course, other approaches to assign a primary or secondary (or tertiary, etc.) node for storing data, copies of that data, and location metadata may be used so long as each node knows which buckets that node is responsible for managing as the primary node at any given time. Note, the actual number of buckets for which a node acts as a secondary or backup node depends on the degree of fault-tolerance in the system. For example, if the degree of fault-tolerance is one (i.e., a single fault is tolerated), then one node is a secondary or backup node for one bucket of (k,v) key values, and two nodes are a secondary node for 2N+1 copies of location metadata.

Figure 3:
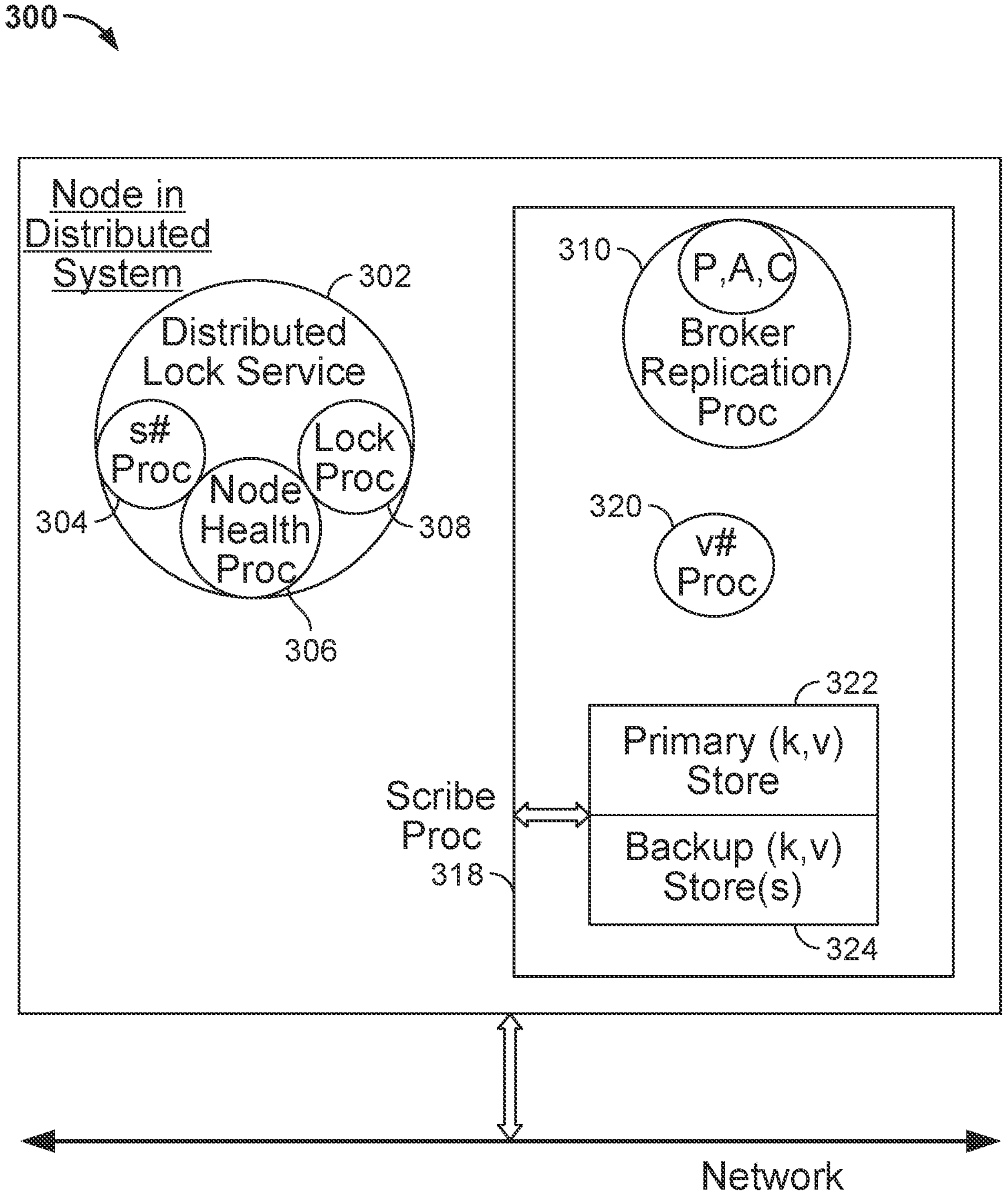
FIG. 3 illustrates an example of a node in a fault-tolerant, consistent key-value store, according to one embodiment.

FIG. 3 illustrates a node 300 in a fault-tolerant, consistent key-value store in one embodiment. As shown, node 300 includes a distributed lock-service 302 and a scribe process 318 that includes a replication 310 process as well as a primary (k,v)-store 322 and one (or more) backup (k,v) stores 324. The distributed lock service 302 ensures that a single scribe process 318 serves as the primary node a particular key-range. That is, the scribe process 318 on each node obtains a lock form the distributed lock-service 302 to perform operations on (k,v) key values which hash to a given bucket (B), while the bridge process on each node obtains locks on individual (k,v) values. Additionally, the distributed lock service 302 monitors a "liveness" status of the nodes in the distributed system via node health process 306. The lock service 302 also provides sequence numbers, via the sequence number process 304. Of course, the functions described herein as being performed by the lock service 302 could be split into individual multiple processes.

As shown, the scribe process 318 includes a replication process 310 and a version number process 320. The scribe process 318 has access to both a primary (k,v)-store 322 and a backup (k,v)-store 324. The scribe process 318 on node 300 receives read and write messages for the both primary and backup key value stores within node 300 and performs the read and write operations to the (k,v)-store. The scribe process 318 on node 300 maintains consistency of the segment of the key-value store on node 300. In one embodiment, the replication process 310 performs a consensus protocol to replicate (k,v) key-values so that the system can tolerate N node failures. For example, when data is written to a (k,v) value in the primary (k,v)-store 322, the replication process 310 replicates that (k,v) value to ensure that the system has N+1 copies of the write, prior to the scribe process 318 confirming that the write operation has been committed successfully. In one embodiment, the replication process 310 maintains a state machine that is typically the same on each node. That is, each node in the distributed system has an instance of the replication process 310 and the replication process 310 on each node can assume any of the roles of client C, proposer P, or acceptor A in a performing a consensus protocol, e.g., Paxos, as described in greater detail below.

The version number process 320 manages version numbers assigned to (k,v)-values. In one embodiment, each (k,v) key-value stored in the (k,v)-store 322 may be associated with a version number, incremented each time a scribe process 318 writes to a given (k,v) key-value. When the scribe process 318 performs a write operation, the version number maintained by the scribe process needs to match a stored version number of the key whose value is being updated. If a version number match occurs. In addition, a sequence number issued by the distributed lock service 302 that is specified by a client requesting scribe process 318 perform an operation needs to be equal to or greater than a value of the sequence number at the key being updated. If both of these conditions are satisfied, then the scribe process performs the requested operation. If the operation a write operation, then the scribe process increments and the version number stored for the key in the (k,v)-store.

As noted, above, in one embodiment, a sequence number is associated with each lock acquisition performed by a client of scribe process 318. For example, a backup process on the node may be creating a backup of a file stored on a primary storage system. To do so, the backup process may write a file to disk-based storage on node 300, as well as send write operations to the scribe process 318 to reflect file system metadata associated with the file written to disk based storage (or send such operations to a bridge process to be performed). To do so, the scribe client obtains a lock and a sequence number for the appropriate values in the (k,v) store. When the scribe client requests that the scribe process 318 perform operations using that sequence number, the sequence can remain constant so long as the scribe client holds the associated lock. The scribe process 318 compares the sequence number received from a client to what is stored for in the (k,v) store. If a first client holding a lock (associated with a particular sequence number) fails and a second client acquires a lock for the same (k,v) value, the second client is guaranteed to receive a higher sequence number. Doing so allows scribe process 318 to reject any subsequent writes requested by a client that have a lower sequence number than what is stored in the scribe (k,v) store As discussed above, FIG. 2 illustrates a single duplication of the (k,v)-store. In FIG. 3, the primary (k,v)-store 322 is the portion of the (k,v)-store assigned to node 300. The backup (k,v)-store 324 is the portion of the key-value store of at least one other node, for which node 300 is designated as the backup node. Because the (k,v)-store stores N+1 copies of each (key, value) to provide fault tolerance for up to N nodes, a consistency protocol ensures that duplicate keys in the (k,v) store have the same value. The consistency protocol enforced by the scribe process 318 provides both (i) a read-after-read consistency (RAR) and (ii) a read-after-write (RAW) consistency. For the read-after-read case, a second read needs to return the same data as a first read, if there is no intervening write. For a read-after-write case, a read must return the latest value written. These cases of consistency are illustrated in FIGS. 8A and 8B, and are discussed further below.

Figure 4:
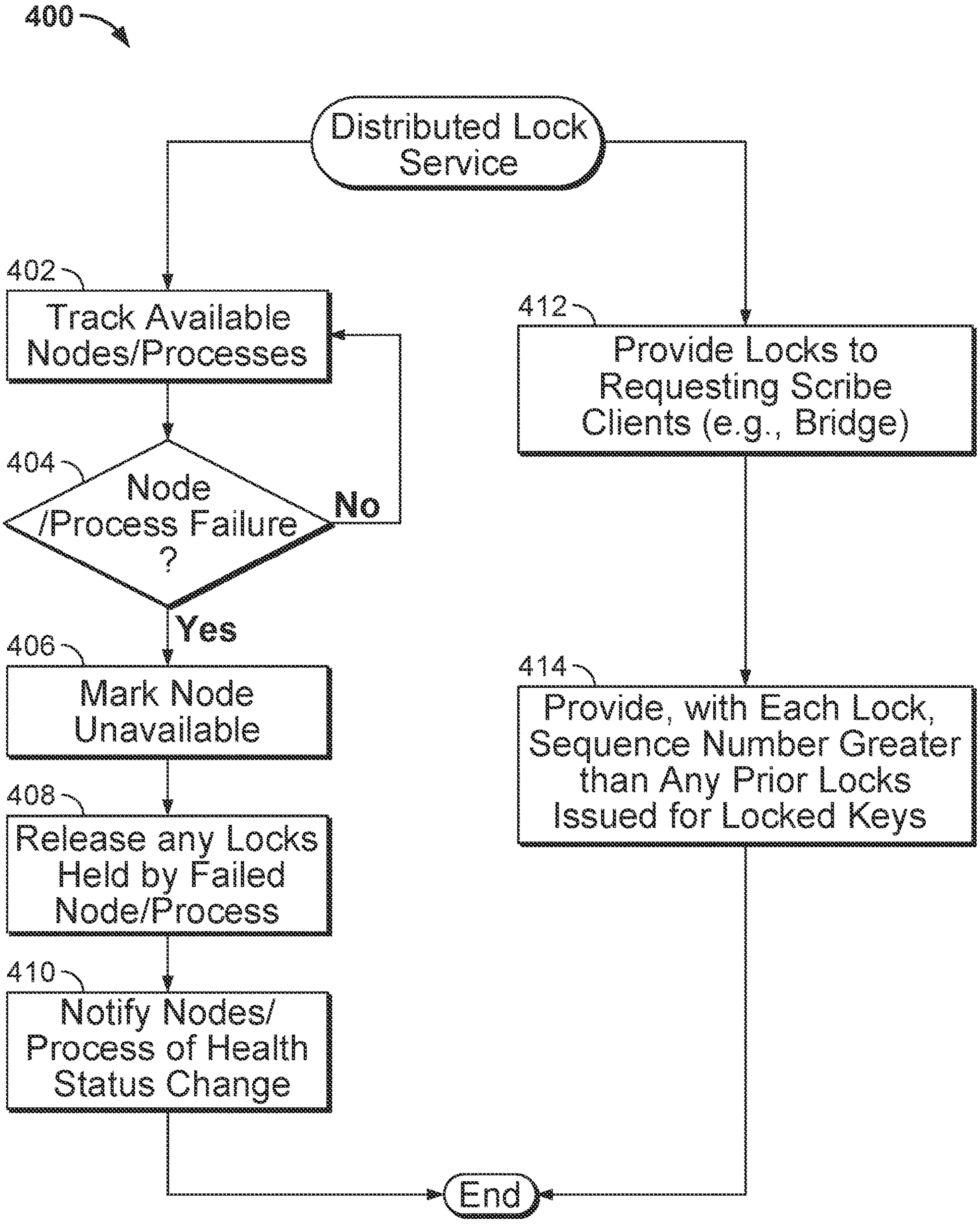
FIG. 4 depicts a flow diagram for the distributed lock service in each node, according to an embodiment of the invention.

FIG. 4 depicts a flow diagram of operations 400 performed by a distributed lock service, according to one embodiment. The distributed lock service (302 in FIG. 3) monitors the health of nodes (referred to above as “liveness”) in a key-value store so that the nodes in a cluster can reach consensus regarding f a node failure. Referring to FIG. 4, at step 402, the lock service tracks the availability of other nodes, or processes on nodes in the cluster. If a node (or process) failure is identified (step 404), the node health process 306 marks a node identified as having failed as being unavailable (step 406). In one embodiment, the node health service communicates with peers on other nodes of the cluster before determining a node (or process) has failed. For example, the nodes may perform a consensus protocol (e.g., Paxos) to determine whether to mark a given node or process as having failed. At step 408, the lock releases any locks held by the failed node or process. At step 410, other nodes of the status change. For example, after determining a node has filed, the lock service releases a lock on a bucket held by the failed node. Doing so allows another node to acquire a lock on that bucket and begin acting as the primary node for that (k,v) keys which hash to that bucket using the consistent hashing algorithm.

The distributed lock service also provides locks and sequence numbers used by scribe clients to perform read and write operation directed to the (k,v)-store. The distributed lock service provides a lock to a client (step 412) and a lock sequence number (step 414). As noted, the lock may correspond to a (k,v) key value or range of values stored in the key-value store. Once a scribe client obtains a lock (and sequence number), the scribe client may request the scribe process 318 perform read and write operations on the (k,v) store using that sequence number. Typically, a scribe client retains a lock on a key (k) until all operations against that file are complete (or until the client process fails). After a certain idle period, the client may release a lock as well.

Figure 5A:
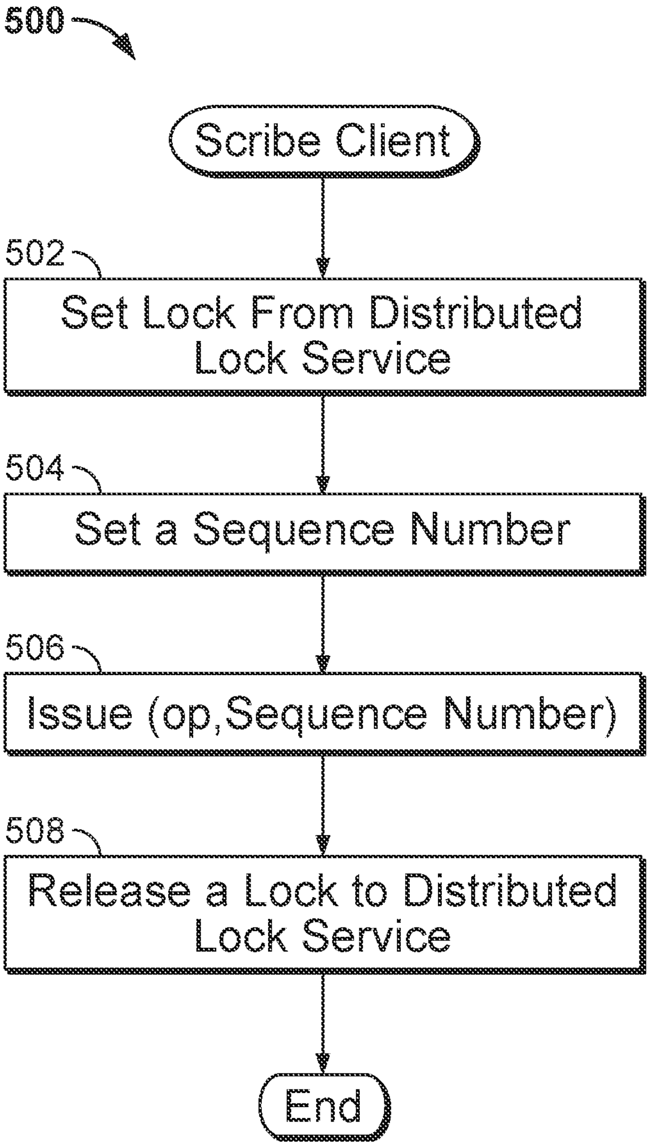
FIG. 5A depicts a flow diagram of tasks in the scribe process, according to an embodiment.

FIG. 5A depicts a method 500 for using a sequence number according to one embodiment. The scribe process performs reads and writes to the key-value store in the distributed system. In the case of a read or write command with the format of op(k,vn,sn,data), where op=rd or wr, k is a key and data is the data associated with the key stored in the (k,v) store, sn is a sequence number is obtained from the lock service, and vn is a version number obtained from the scribe process for writes. As shown, the method 500 begins at step 502, where the scribe client requests a lock from the distributed lock service. At step 504, the distributed lock service provides the sequence number sn, along with the lock. At step 506, the scribe client issues a read or write operation to the scribe process, using the obtained sequence number. At step 508, after scribe performs any requested operations on a given (k,v) key value pair (or after holding a lock on a key value that has been idle for a predefined time), the scribe client may inform the distributed lock service that a given lock may be released. In one embodiment, a read of the (k,v)-store has the format rd(k,vn,sn, data), where "k" is the key, "vn" is a version number, "sn", is a sequence number, the "e is a value tuple associated with the key and the read arguments (k,vn,sn,data) are stored in the (k,v)-store. Preferably, reads/write operations do not require a new sequence number for each operation requested by the same scribe client. Instead, a client may use the same sequence number so long as it holds a lock.

Figure 5B:
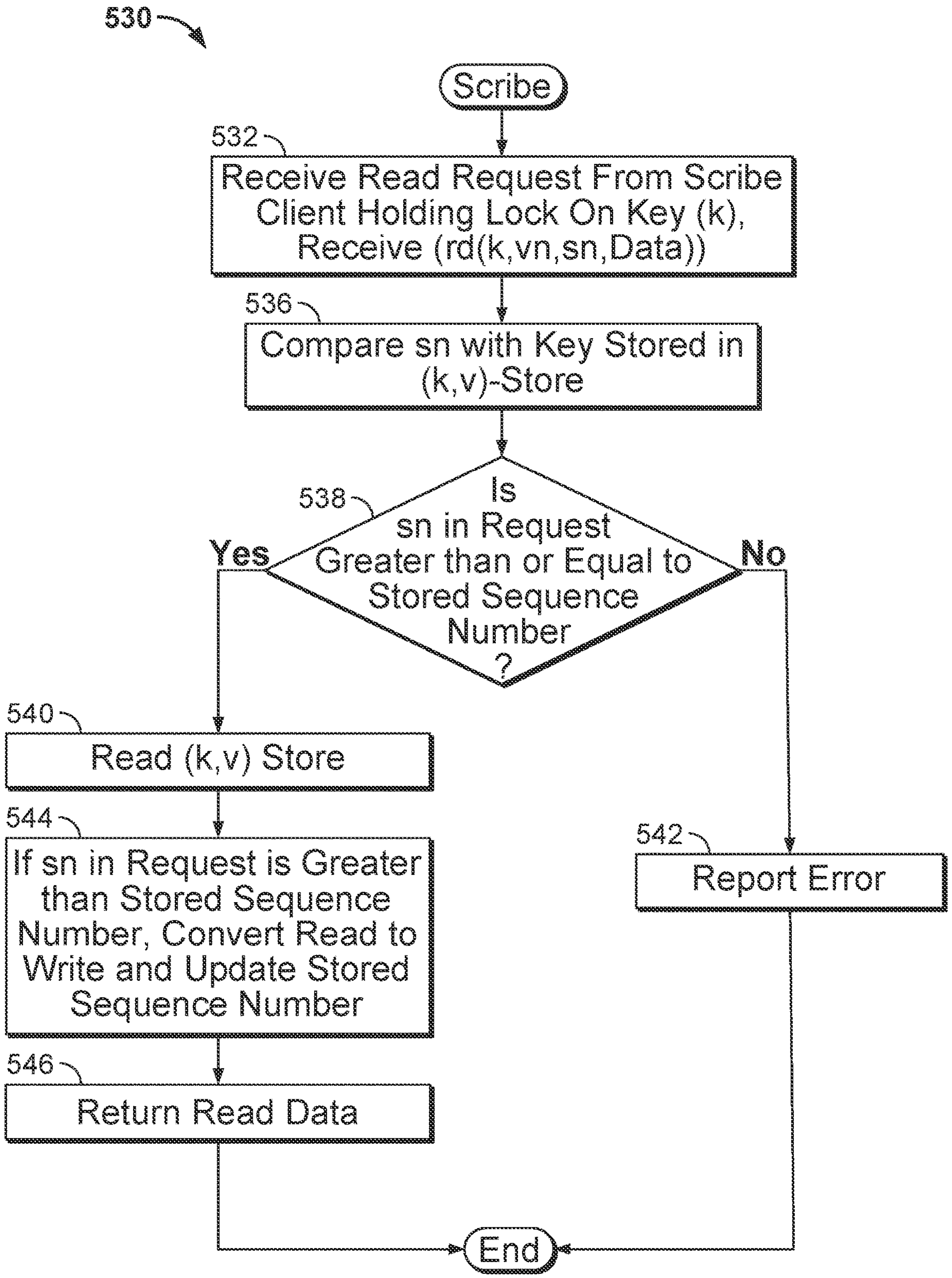
FIG. 5B depicts a flow diagram of a read operation by the scribe process, according to an embodiment.

FIG. 5B depicts a method 530 for performing a read operation in a distributed, key value store, according to one embodiment. In step 532, the scribe process receives a read request, which can be a request originating in the same node as the scribe process, but can be from clients on other nodes as well. In step 536, the scribe process compares the sequence number of the request with the sequence number of the key stored in the (k,v)-store. If the sequence number of the read operation being performed is equal to or larger than the sequence number stored in the (k,v)-store as determined in step 538, then scribe reads the key data (step 540). As described below, the scribe process may perform a consensus algorithm to ensure the (k,v) value on the primary node is not stale due to a particular sequence of node failures. If the sequence number in the request is larger than what is stored in the (k,v) store, the read operation of the key is converted into a write operation on the key (step 544), because the sequence number stored with the key-value pair needs to be updated. At step 546, the scribe process returns the data in the (k,v) store to the requesting scribe client. If the sequence number supplied with the operation is smaller than the sequence number for the key stored in the (k,v)-store, the operation fails and scribe reports an error to the requesting client (step 542).

Figure 5C:
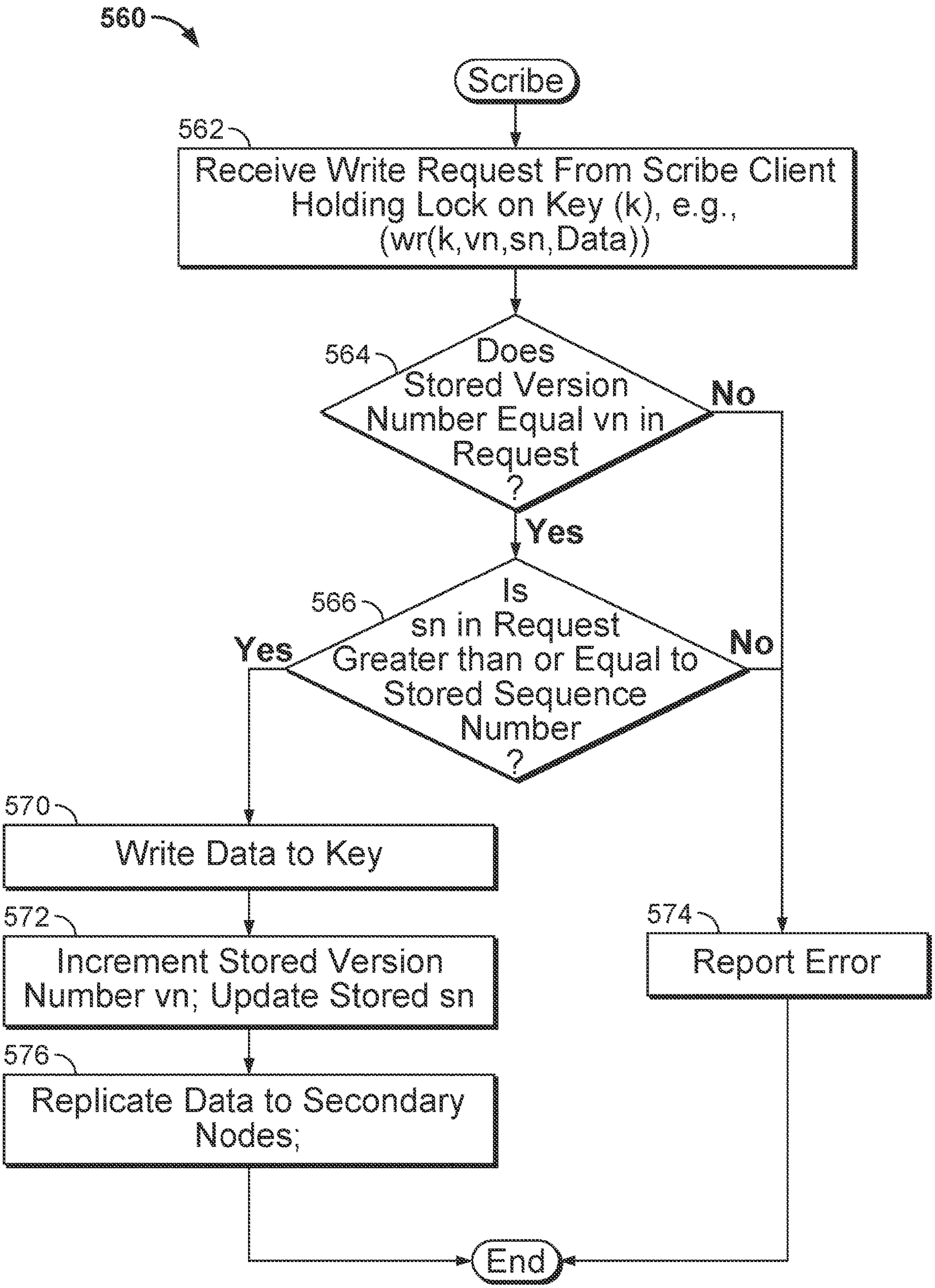
FIG. 5C depicts a flow diagram of a write operation by the scribe process, according to an embodiment.

In one embodiment, a write to the (k,v)-store has the format wr(k,vn,sn,data), where "k" is the key, "vn" is a version number, "sn", is a sequence number, the "data" is a value tuple associated with the key, and the write arguments (k,vn,sn,data) are stored in the (k,v)-store. FIG. 5C depicts a method 560 for performing a write operation in a distributed, fault-tolerant key value store, according to one embodiment. As shown, the method 560 begins at step 562, where the scribe process receives a write request. In step 564, the scribe process compares a version number stored with the key to a the version number vn included in the write request. If the version numbers are not equal, the operation is rejected and scribe reports an error to the client (step 574). In step 566, the scribe process compares a sequence number in the request with a sequence number of the key in the (k,v)-store.

At step 566, if the sequence number in the request is larger than or equal to the sequence number stored in the (k,v)-store, then the scribe process performs an atomic compare and swap to update the key. More specifically, the compare and swap writes the data to the key (step 570), increments the version number (step 572) and if the sequence number is larger, the scribe process updates the sequence number sn stored with the key. At step 576, scribe replicates the (k,v) value to N+1 nodes to tolerate N failures. In addition, if the nodes on which (k,v) value is stored changes as a result of the write (e.g., should a secondary node have failed and scribe writes the (k,v) value to the primary node and a replacement secondary node), then scribe updates the location metadata for the (k,v) key value was well.

Again at 566, if the sequence number in the write request is less than the sequence number in the (k,v)-store, then the scribe process reports an error (step 574) and no write is performed. The result of these steps is that the key in the (k,v)-store that is targeted for an update is not updated if the write is stale or out of date. Conversely, if the scribe process updates the (k,v) pair, then the version number stored in the key value store is incremented. Thus, a write operation on the (k,v)-store requires both a equal or larger sequence number and an exactly matching version number for a write to succeed.

The replication process 310 in FIG. 3 replicates updates based on a consensus algorithm. The algorithm is implemented by replicating a finite deterministic state machine on each of the nodes. Thus, process 310 each node includes one of the replicated state machines. In one embodiment, the replication process 310 may be tailored to have fewer messages than other versions of the algorithm. The replication process 310 can obtain consensus regarding a proposed (k,v)-store key value even if up to N nodes simultaneously fail, where N+1 is the total number of main nodes and there are N nodes that can take part in reconfiguring the distributed system of nodes system to remove the failed node The consensus algorithm is further described below in conjunction with FIG. 8.

Figure 6:
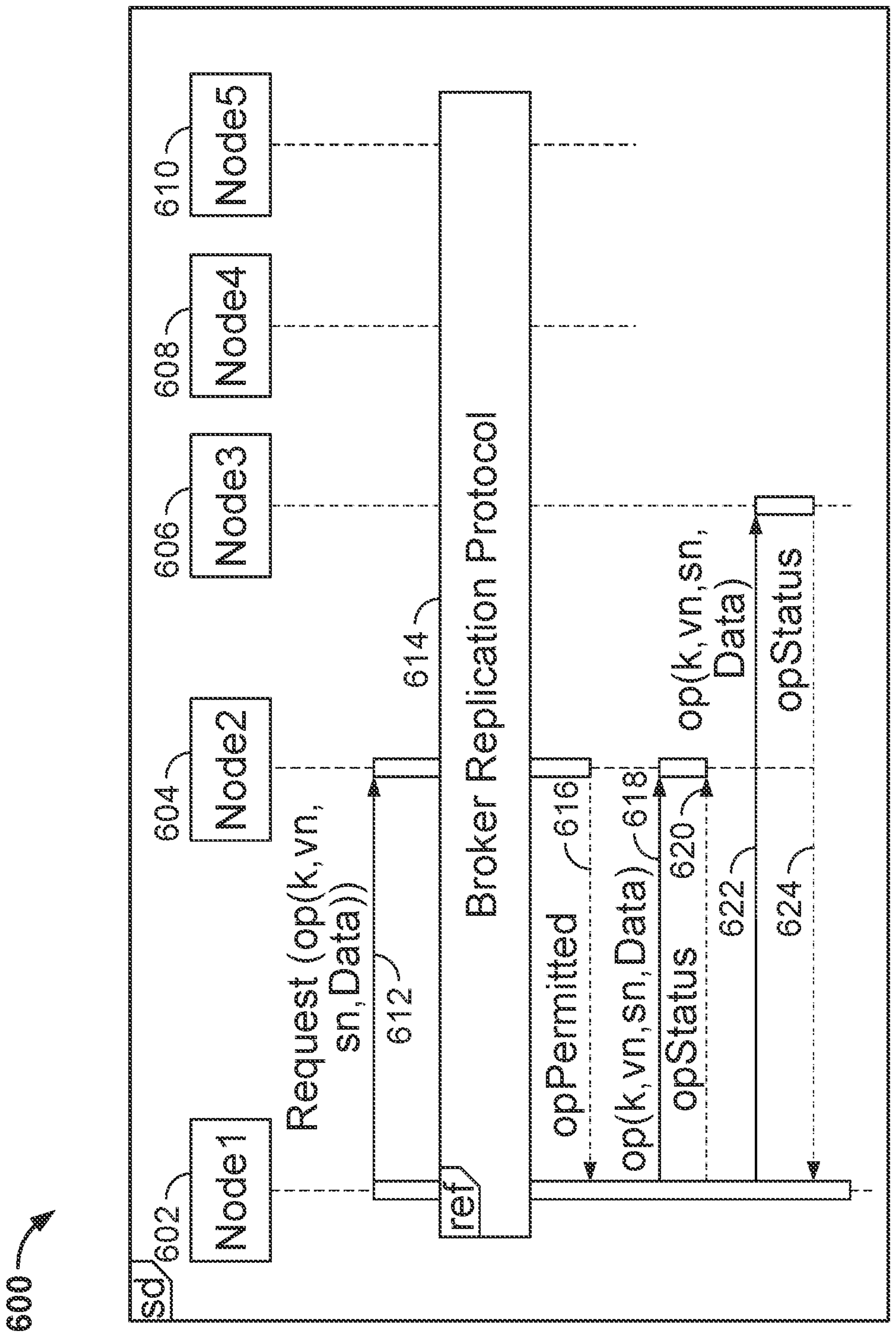
FIG. 6 depicts a sequence diagram of a key update process, according to an embodiment.

FIG. 6 depicts a sequence diagram 600 of a key update process to assure that there is consensus and consistency in accordance with an embodiment of the invention. In the figure, when a client, say node 1 602, makes a request 612, request(op(k,vn,sn,data)) to the key-value store, all of the nodes 602, 604, 606, 608, 610 participate in the consensus protocol as depicted in the diagram, where the requested operation becomes a value in the protocol 614 on which the nodes 604, 606, 608, 610 vote to reach a consensus. The result of the protocol 614 is that if a majority of acceptors accepts the value, then an opPermitted message 616 is sent back to the node 602 requesting the operation indicating that the other nodes 604, 606, 608, 610 agree that the operation can be performed. Upon receiving the opPermitted message 616, the client, node 1 602, sends a message op(k,vn,sn,data) 618 to perform the operation op(either a read or a write) on the value v of the key k in the (k,v)-store in node 2, which has been assigned as the primary node to handle the key in the (k,v) pair being updated. If the operation is a write, the client, node 1, also sends a message op(k,vn,sn,data) 622 to perform the operation op on the value of the key in node 3, which is the backup node for the key in the (k,v) pair, again assuming that the keys are duplicated only once. Upon receipt of the operation message 618, the scribe process in node 2 604 examines the sequence number in the operation message and attempts to perform the operation on the key in the (k,v)-store according to the method 560 discussed above. If the operation is successful, node 2 returns an opStatus message 620 indicating confirming the operation was performed. In the case of a write operation, the scribe process in node 3 606 also receives the update message, examines the sequence number in the update request, and attempts to perform the operation on the on the key in the (k,v)-store using method 560. If successful, node 3 606 returns an opStatus message 624 indicating the write was performed. Thus, the replication and scribe processes carry out both a consensus check and a consistency check. Doing so guarantees that the (k,v)-store is consistent and fault-tolerant.

Performing both the consistency protocol and the consensus protocol can create a large amount of message traffic on network 112 in FIG. 1. For high performance, steps are needed to make this traffic more efficient. First, in one embodiment, N+1 copies of a (k,v) key value are needed to tolerate N simultaneous failures. In addition, the distributed key value store includes 2N+1 copies of location metadata indicating which nodes store a given (k,v) value. (need 2N+1 3N+1) This reduces message traffic to carry out the consensus protocol. Second, the messages, such as Remote Procedure Call (RPC) messages, are batched to amortize the cost of sending and receiving messages over the network 112. Doing so reduces the message traffic, as well as reduces CPU processing requirements. Third, the consensus protocol preferably operates in the steady state, i.e., with a node being a primary node for an bucket (B) of keys identified using the hashing algorithm. This means that a read by a client from a node only requires a single message and that a write by a client requires only two messages, one from the client to node with the primary (k,v)-store and one from the client to node with the backup (k,v)-store. That is, if the system is configured to handle N failures, then exactly N+1 RPC messages are needed to perform the replication. Finally, using locking on single keys in the (k,v)-store helps improve performance because concurrent operations on other keys in the (k,v)-store are permitted by the nodes.

As explained above, a consistency protocol performed by the scribe process 318 may be used to maintain consistent data in the (k,v)-store. The consistency protocol in one embodiment provides a mechanism for assuring consistency in the read-after-read (RAR) case and the read-after-write (RAW) case.

Figure 7A:
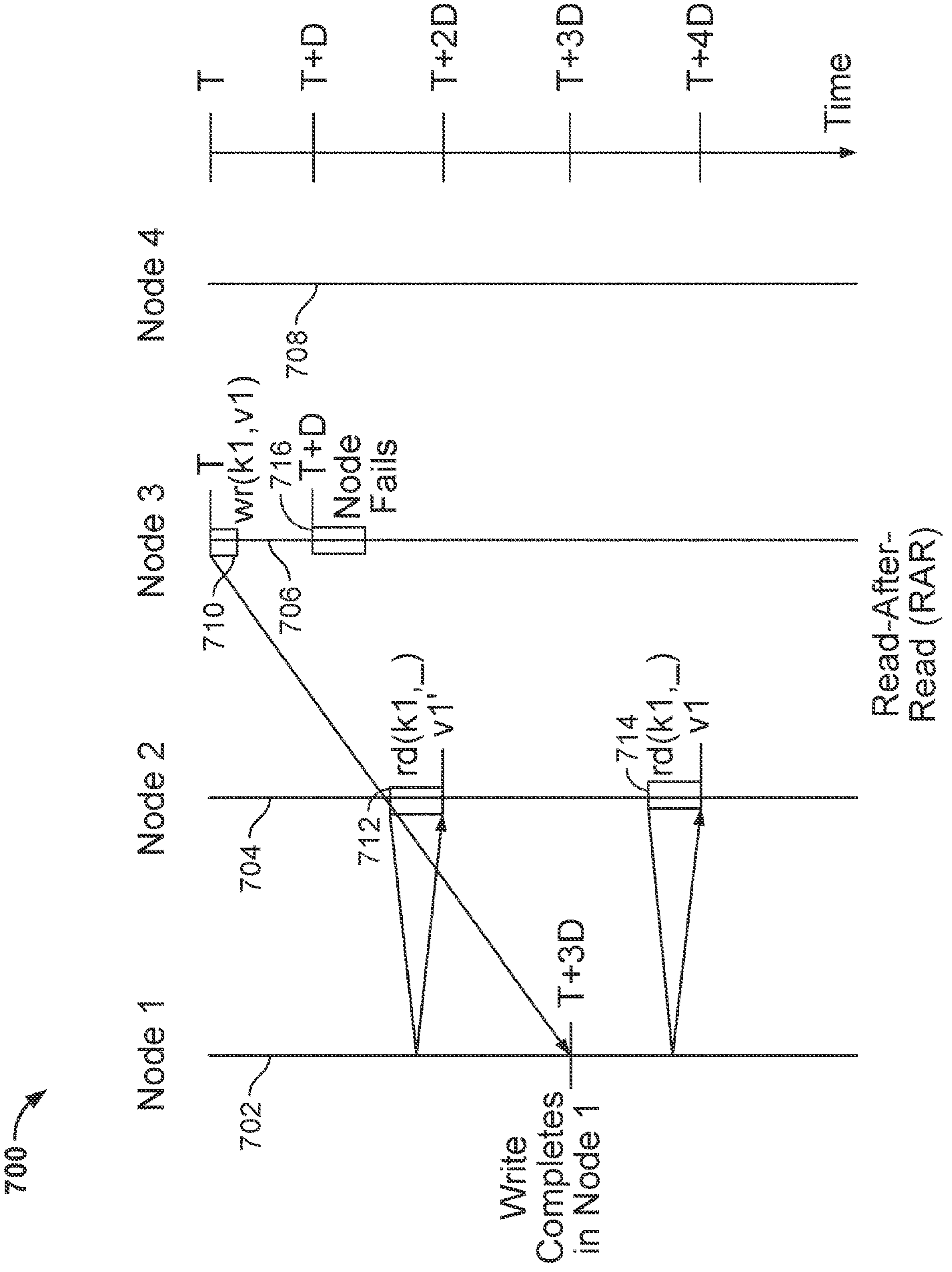
FIG. 7A depicts a time-sequence diagram for read-after-read (RAR) consistency in a distributed key value store in which the scribe process operates, according to one embodiment.

FIG. 7A depicts a time-sequence diagram 700 for read-after-read (RAR) consistency in a distributed key value store in which the scribe process 318 operates, according to one embodiment. As shown, 702, 704, 706, and 708 are time lines, where time increases downwards, for nodes 1, 2, 3, and 4, respectively. At time T, node 3 issues a write 710 (i.e., wr(k1, v1)), which is a write to k1 with value v1. At time T+D, node 3 fails. At time T+2D, node 1 issues a read 712 (i.e., rd(k1,_) and obtains v1', which is not v1, because the write 710 from node 3 has been placed in node 1's FIFO queue, but has not completed until time T+3D is reached. At time T+4D, node 1 issues a read 714 (i.e., rd(k1,_) and obtains value v1, because the write from node 1 has completed. In this case, the read-after-read rule is violated because two reads of the same key return different data as the delayed write operation 710 took time to reach node 1 (e.g., due to network delay). The consistency protocol of the scribe process 320 in FIG. 3 prevents this violation from occurring by means of sequence numbers included in each of the write operations. In the case depicted, the write at T+3D is rejected because its sequence number is lower than the read 712, meaning that write 710 is a stale write and is not permitted to occur.

Figure 7B:
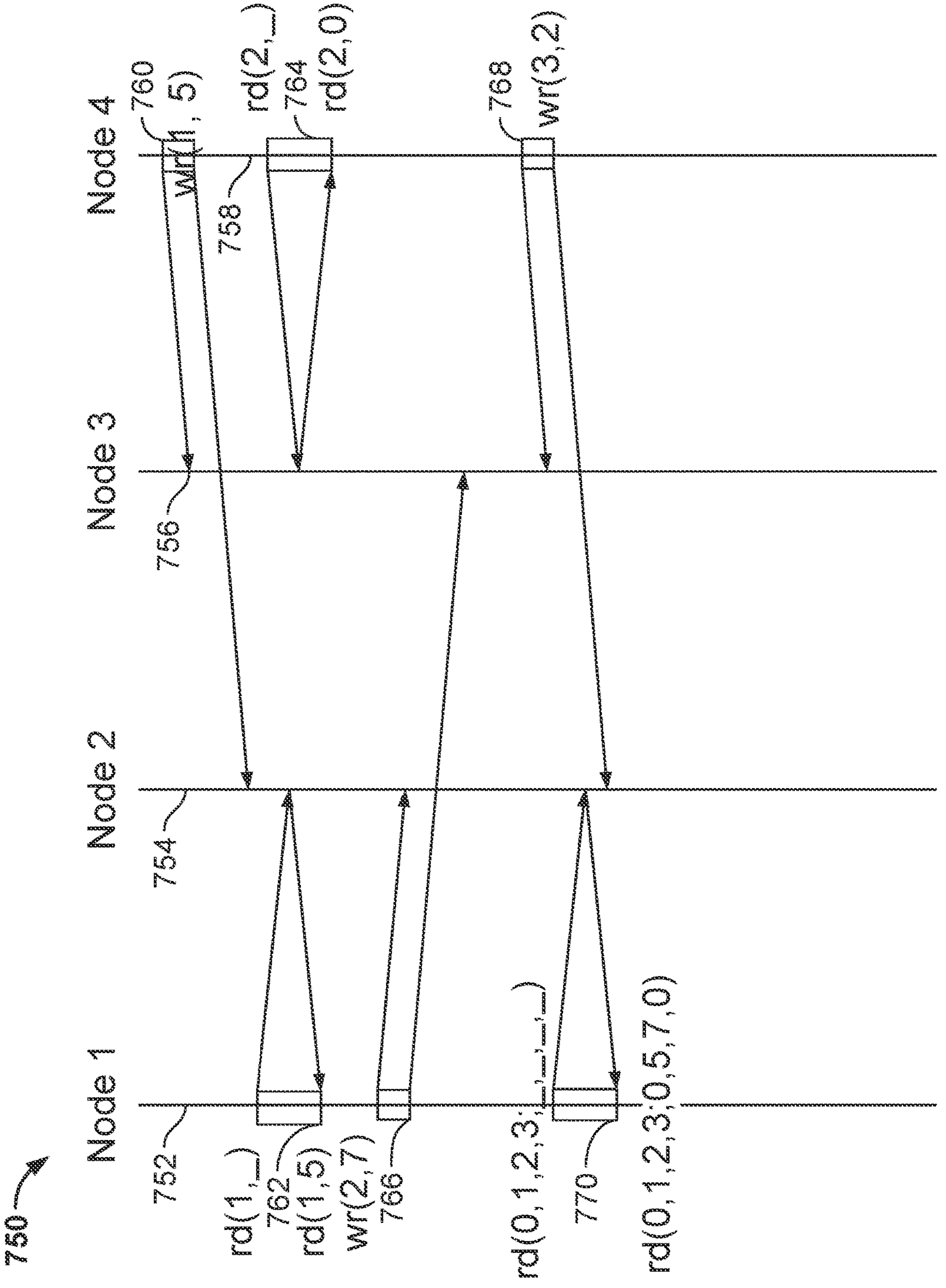
FIG. 7B depicts a time-sequence diagram for read-after-write (RAW) consistency in which the scribe process operates, according to one embodiment.

FIG. 7B depicts a time-sequence diagram 750 for read-after-write (RAW) consistency in which the scribe process 318 operates, according to one embodiment. In the figure, 752, 754, 756, and 758 are time lines for nodes 1, 2, 3, and 4, respectively. In time-order, node 4 issues a write 760 (i.e., wr(1,5)), which is a write to key=1 with a value of 5, to both node 2 and node 3. Next, node 1 issues a read 762 (i.e., rd(1,_)) and obtains a value of 5. Next, node 4 issues a read 764 (i.e., rd(2,_)) and obtains a value of 0 (the default value). After node 4's read operation 764, node 1 issues write 766 (i.e., wr(2,7)) to both nodes 2 and 3. Following this, node 4 issues write 768 (i.e., wr(3,2)) to both node 3 and node 2. Lastly, node 1 issues a read operation 770 (i.e., rd(0,1,2,3; 0,5,7,0)) to obtain the values of all of the keys. Thus, as shown in FIG. 7B, the read after the write is read 770 and the writes are 760 and 766. The operations ordered by increasing sequence numbers are 760, 762, 764, 766, 768, and 770. Thus, 770 having the highest sequence number should return the updates performed by the lower sequence number writes. The two writes with lower sequence numbers are 760 and 766. Read 770 returns the value for 5, for key=1 and the value 7 for key=2, thus satisfying the consistency rule. However, sequence numbers alone are insufficient for maintaining consistency. Consider 3 nodes N1, N2, N3. If N2 is down, a write (k1, v1) would be replicated to N1 and N3. At this point, if N1 were to go down and N2 were to come back up, a read for K1 on N2 should return (k1, v1) which it initially doesn't have. In such a case, the scribe process uses the consensus algorithm to come to a consensus with N3 and return (k1, v1).

Figure 8:
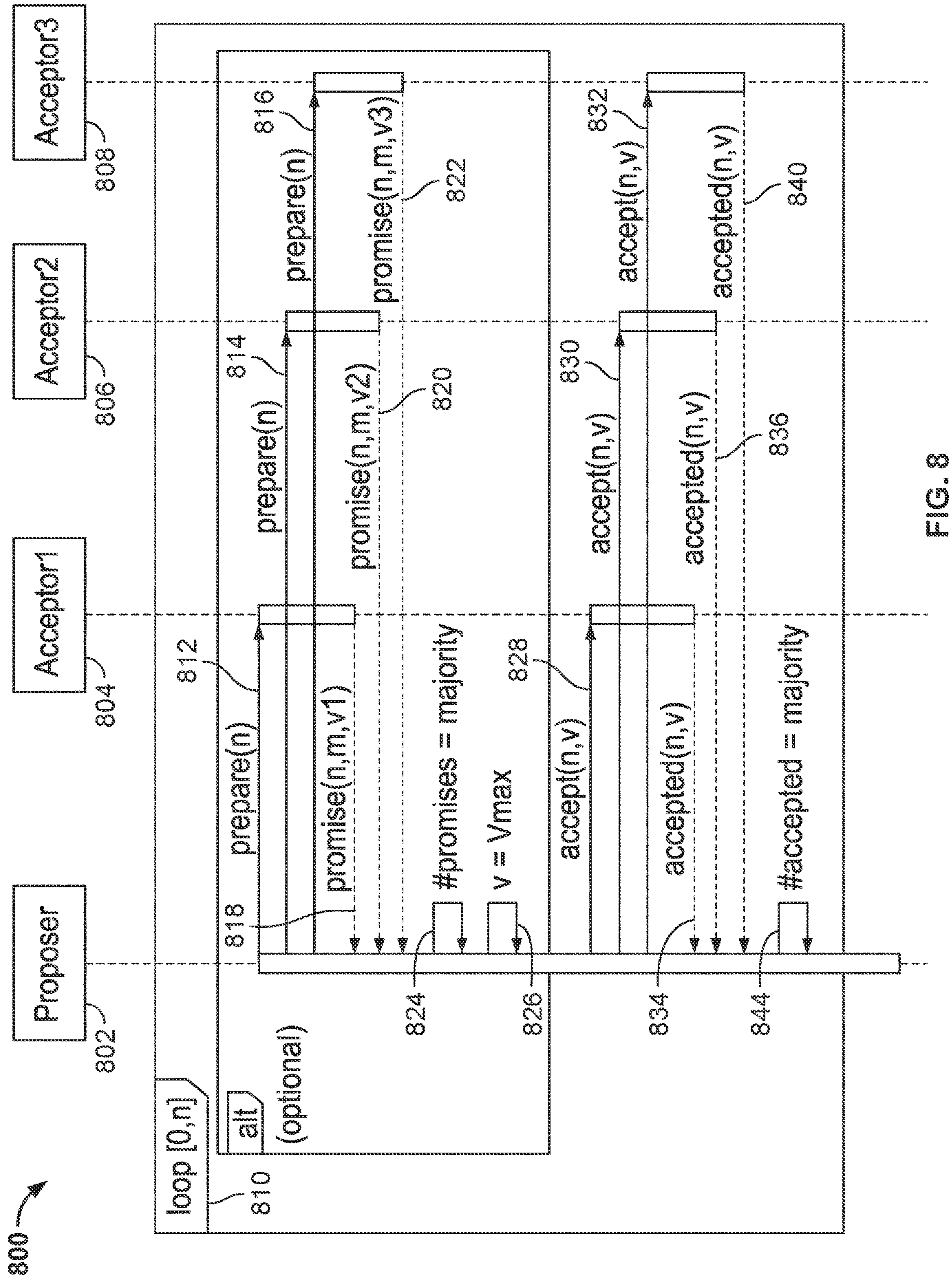
FIG. 8 depicts a sequence diagram for a consensus protocol, according to one embodiment.

As explained above, a consensus protocol allows the key-value store to service requests despite node failures. FIG. 8 illustrates one such protocol operating among three nodes, where each node can assume any role, such as client (C), proposer (P), or acceptor (A), in the protocol. As shown, the protocol has a proposer 802 and three acceptors 804, 806, 808, which are the nodes in the distributed system. When a client needs a consensus decision on a proposed update to the key-value store, the proposer 802 enters a loop 810, which ranges from 0 to n, selecting a proposal number n for the proposed update and broadcasts a prepare message, prepare(n) 812, 814, 816, to all of the acceptors 804, 806, 808. If an acceptor 804, 806, 808 receives a prepare request 812, 814, 816 with a proposal number n greater than a proposal number in any prepare request to which it has already responded, then each acceptor 804, 806, 808 replies with a promise, promise(n,m,v1) 818, promise(n,m,v2) 820, promise(n,m,v3) 822 not to accept any more prepare messages with proposal numbers less than n and with the highest numbered proposal m that it has accepted along with the value (v1, v2, v3) associated with m. The proposer 802 then determines if it, the proposer 802, has received responses with proposal number n from a majority of acceptors 804, 806, 807 in step 824 and if so, determines the value v for the proposal with proposal number n, where v is the value in the promise messages 818, 820, 822 with the highest proposal number or any value if the promise messages return no values in step 826. The proposer 802 then sends an accept message accept(n,v) 828, 830, 832 with proposal number n and the value v to each of the acceptors 804, 806, 808 and upon receiving a reply accepted(n,v) 834, 836, 840 from a majority of acceptors in step 844, indicates that it, the proposer 802, has achieved a consensus that the proposed update with value v can proceed. If a consensus is not achieved, the proposal number n is incremented and the process is repeated until a consensus is achieved. In the case illustrated, the protocol allows for the possibility that one of the acceptors can fail, and consensus will still be achieved, because the remaining acceptors will still constitute a majority.

If the proposer 802 is always the name node, not subject to failure, and knows the highest round number to date, it is possible exclude the first phase of the process 844 (the prepare 812, 814, 816, and promise messages 818, 820, 822), thus establishing a consensus by just sending accept and receiving a majority of accepted messages. This also reduces the message traffic on the network to which the nodes are coupled.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system, comprising:

a processor associated with a first node of a plurality of nodes, wherein the processor is configured to:

receive from a client a first message to perform a write operation associated with a key-value pair, wherein the first message at least includes a key, a version number associated with the key-value pair, and a sequence number associated with the write operation;

in response to receiving the first message:

compare the version number associated with the key-value pair included in the first message with a stored version number associated with the key-value pair, wherein the stored version number associated with the key-value pair is incremented each time a value is written to the key-value pair;

determine whether the version number associated with the key-value pair included in the first message is equal to the stored version number associated with the key-value pair; and perform, in response to a determination that the version number associated with the key-value pair included in the first message is equal to the stored version number associated with the key-value pair, the write operation and increment the stored version number associated with the key-value pair;

in response to incrementing the stored version number, select, according to a consistent hashing algorithm, at least one secondary node of the plurality of nodes to which to replicate the key-value pair and generate a second message to replicate the key-value pair to the at least one secondary node of the plurality of nodes, wherein the first node and the at least one secondary node each obtains a lock from a distributed lock service for a hash bucket corresponding to the key-value pair, the lock being associated with the sequence number;

in response to detecting a failure of the at least one secondary node, select, according to the consistent hashing algorithm, at least one tertiary node of the plurality of nodes and generate a third message to replicate the key-value pair to the at least one tertiary node of the plurality of nodes;

maintain multiple copies of location metadata indicating which of the plurality of nodes store the key-value pair;

batch at least one of the second message or the third message with additional messages for sending to at least one of the secondary node of the plurality of nodes or the tertiary node of the plurality of nodes; and a memory coupled to the processor, wherein the memory provides the processor with instructions.

2. The system of claim 1, wherein in an event the sequence number associated with the write operation is not greater than or equal to a stored sequence number associated with the key, the processor reports an error to the client.

3. The system of claim 1, wherein in an event the sequence number associated with the write operation is greater than or equal to a stored sequence number associated with the key, the processor writes data to the key.

4. The system of claim 3, wherein the key is associated with at least the stored version number associated with the key-value pair, the stored sequence number associated with the key, and the data.

5. The system of claim 3, wherein the processor replicates the data to one or more other nodes of the system.

6. The system of claim 5, wherein the data is replicated using a consensus algorithm.

7. The system of claim 1, wherein the plurality of nodes is configured to store corresponding portions of a distributed key-value store.

8. The system of claim 1, wherein a value associated with the key is stored in at least two of the plurality of nodes.

9. A method, comprising:

receiving from a client a first message to perform a write operation associated with a key-value pair, wherein the first message at least includes a key, a version number associated with the key-value pair, and a sequence number associated with the write operation;

in response to receiving the first message:

comparing the version number associated with the key-value pair included in the first message with a stored version number associated with the key-value pair, wherein the stored version number associated with the key-value pair is incremented each time a value is written to the key-value pair;

determining whether the version number associated with the key-value pair included in the first message is equal to the stored version number associated with the key-value pair;

performing, in response to a determination that the version number associated with the key-value pair included in the first message is equal to the stored version number associated with the key-value pair, the write operation and incrementing the stored version number associated with the key-value pair;

in response to incrementing the stored version number, selecting, according to a consistent hashing algorithm, at least one secondary node of a plurality of nodes to which to replicate the key-value pair and generating a third message to replicate the key-value pair to the at least one secondary node of the plurality of nodes, wherein the first node and the at least one secondary node each obtains a lock from a distributed lock service for a hash bucket corresponding to the key-value pair, the lock being associated with the sequence number;

in response to detecting a failure of the at least one secondary node, selecting, according to the consistent hashing algorithm, at least one tertiary node of the plurality of nodes and generating a third message to replicate the key-value pair to at least one tertiary node of the plurality of nodes;

maintaining multiple copies of location metadata indicating which of the plurality of nodes store the key-value pair; and batching at least one of a second message and the third message with additional messages for sending to at least one of the secondary node of the plurality of nodes and the tertiary node of the plurality of nodes.

10. The method of claim 9, further comprising reporting an error to the client in response to determining that the sequence number associated with the write operation is not greater than or equal to a stored sequence number associated with the key.

11. The method of claim 9, further comprising writing data to the key in response to a determination that the sequence number associated with the write operation is greater than or equal to a stored sequence number associated with the key.

12. The method of claim 11, wherein the key is associated with at least the stored version number associated with the key-value pair, the stored sequence number associated with the key, and the data.

13. The method of claim 11, further comprising updating the sequence number associated with the key.

14. The method of claim 13, further comprising replicating the data to one or more other nodes of a system.

15. The method of claim 14, wherein the data is replicated using a consensus algorithm.

16. A computer program product, the computer program product being embodied in a non-transitory computer readable medium and comprising computer instructions for:

receiving from a client a first message to perform a write operation associated with a key-value pair, wherein the first message at least includes a key, a version number associated with the key-value pair, and a sequence number associated with the write operation;

in response to receiving the first message:

comparing the version number associated with the key-value pair included in the first message with a stored version number associated with the key-value pair, wherein the stored version number associated with the key-value pair is incremented each time a value is written to the key-value pair;

determining whether the version number associated with the key-value pair included in the first message is equal to the stored version number associated with the key-value pair;

performing, in response to a determination that the version number associated with the key-value pair included in the first message is equal to the stored version number associated with the key-value pair, the write operation and incrementing the stored version number associated with the key-value pair;

in response to incrementing the stored version number, select, according to a consistent hashing algorithm, at least one secondary node of a plurality of nodes to which to replicate the key-value pair and generate a second message to replicate the key-value pair to the at least one secondary node of the plurality of nodes, wherein a first node and the at least one secondary node each obtains a lock from a distributed lock service for a hash bucket corresponding to the key-value pair, the lock being associated with the sequence number;

in response to detecting a failure of the at least one secondary node, select, according to the consistent hashing algorithm, at least one tertiary node of the plurality of nodes and generate a third message to replicate the key-value pair to the at least one tertiary node of the plurality of nodes;

maintain multiple copies of location metadata indicating which of the plurality of nodes store the key-value pair; and batch at least one of the second message and the third message with additional messages for sending to at least one of the secondary node of the plurality of nodes and the tertiary node of the plurality of nodes.

17. The computer program product of claim 16, further comprising instructions for reporting an error to the client in response to determining that the sequence number associated with the write operation is not greater than or equal to a stored sequence number associated with the key.

* * * * *